(12) United States Patent
Hoehne et al.

(10) Patent No.: US 11,281,928 B1
(45) Date of Patent: Mar. 22, 2022

(54) QUERYING SEMANTIC DATA FROM UNSTRUCTURED DOCUMENTS

(71) Applicant: SAP SE, Walldorf (DE)

(72) Inventors: Johannes Hoehne, Berlin (DE); Christian Reisswig, Berlin (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/029,180

(22) Filed: Sep. 23, 2020

(51) Int. Cl.
  *G06K 9/34* (2006.01)
  *G06K 9/46* (2006.01)
  *G06F 16/903* (2019.01)
  *G06T 7/11* (2017.01)

(52) U.S. Cl.
  CPC ....... *G06K 9/344* (2013.01); *G06F 16/90344* (2019.01); *G06K 9/46* (2013.01); *G06T 7/11* (2017.01); *G06K 2209/01* (2013.01); *G06T 2207/20084* (2013.01)

(58) Field of Classification Search
  CPC ...... G06K 9/344; G06K 9/46; G06K 2209/01; G06F 16/90344; G06T 7/11; G06T 2207/20084
  See application file for complete search history.

(56) References Cited

U.S. PATENT DOCUMENTS

| | | | | |
|---|---|---|---|---|
| 6,026,177 A * | 2/2000 | Mong | ................. | G06K 9/3233 |
| | | | | 382/156 |
| 8,261,200 B2 * | 9/2012 | Denoue | ............... | G06F 16/5846 |
| | | | | 715/764 |
| 10,007,863 B1 * | 6/2018 | Pereira | ................. | G06K 9/6267 |
| 10,395,772 B1 * | 8/2019 | Lucas | .................... | G16H 10/60 |
| 10,540,579 B2 * | 1/2020 | Reisswig | ............... | G06K 9/726 |
| 2003/0095135 A1 * | 5/2003 | Kaasila | ................. | G06T 11/203 |
| | | | | 345/613 |
| 2005/0259866 A1 * | 11/2005 | Jacobs | ................. | G06K 9/4614 |
| | | | | 382/157 |
| 2017/0004374 A1 * | 1/2017 | Osindero | ............... | G06K 9/325 |
| 2017/0249377 A1 * | 8/2017 | Raffill | .............. | G06F 16/90344 |
| 2017/0323425 A1 * | 11/2017 | Masuko | .................... | G09G 3/20 |
| 2019/0026550 A1 * | 1/2019 | Yang | ..................... | G06N 3/0454 |

(Continued)

OTHER PUBLICATIONS

Learning to Extract—Neural Networks, Xiao Yang et al., Jun. 7, 2017, pp. 1-16 (Year: 2017).*

(Continued)

*Primary Examiner* — Jayesh A Patel
(74) *Attorney, Agent, or Firm* — Sterne, Kessler, Goldstein & Fox P.L.L.C.

(57) ABSTRACT

Disclosed herein are system, method, and computer program product embodiments for querying document terms and identifying target data from documents. In an embodiment, a document processing system may receive a document and a query string. The document processing system may perform optical character recognition to obtain character information and positioning information for the characters of the document. The document processing system may generate a two-dimensional character grid for the document. The document processing system may apply a convolutional neural network to the character grid and the query string to identify target data from the document corresponding to the query string. The convolutional neural network may then produce a segmentation mask and/or bounding boxes to identify the targeted data.

20 Claims, 9 Drawing Sheets

(56) References Cited

U.S. PATENT DOCUMENTS

2019/0196698 A1* 6/2019 Cohen .................... G10L 15/22
2020/0117961 A1   4/2020 Reisswig et al.
2020/0193609 A1* 6/2020 Dharur .................... G06T 7/11

OTHER PUBLICATIONS

Document Image page segmentation and character recognition as Semantic Segmentation, Seth Stewart et al., Nov. 2017, pp. 101-106 (Year: 2017).*

CloudScan—A configuration—Networks, Rasmus Berg Palm et al., IEEE, 10.1109/ICDAR.2017.74, 2017, pp. 406-413 (Year: 2017).*

Reading Text in the wild—Networks, Max Jaderberg et al., Springer, 10.1007/s11263-015-0823-z, 2016, pp. 1-20 (Year: 2016).*

STN-OCR: A Single neural network—Recognition, Christian Bartz et al., arXiv, Jul. 27, 2017, pp. 1-9 (Year: 2017).*

Extended European Search Report, European Patent Appl. No. 21190955.1, 12 pages, dated Jan. 27, 2022.

Bhunia, A.K. et al., "A Deep One-Shot Network for Query-based Logo Retrieval," ArXiv.org, Cornell University Library, 30 pages, Jun. 27, 2019.

Reisswig, C. et al., "Chargrid-OCR: End-to-end Trainable Optical Character Recognition through Semantic Segmentation and Object Detection," ArXiv.org, Cornell University Library, 4 pages, Sep. 13, 2019.

* cited by examiner

200A

INVOICE — 210
34289 — 215

THE CAR COMPANY
12345 South North Street, Washington, DC 20005
Telephone: 555-555-5555
https://www.carcompany.com/

| DATE | 28-Aug-2020 |
|---|---|
| DUE DATE | 10-Sep-2020 |
| ACCOUNT | 66711 |

220

CAR # | 687250 | — 225

To: Buyer Ltd.
6789 East Street
Washington, DC 20005

Work Requested:

Per phone call from Ben: Customer advised that the air conditioning and radio are malfunctioning.

Ben # 555-241-2073

Ben cell # 555-005-6912

Work Performed: 8/16/20

Repaired air conditioning and radio.

Received By:

| | |
|---|---|
| Sale | 809.50 |
| Sales Tax | 65.34 |
| Total | 874.84 |

205A INVOICE
34289

205B INVOICE
34289

QUERYING SEMANTIC DATA FROM UNSTRUCTURED DOCUMENTS

BACKGROUND

Systems have been created to automate the extraction of structured information from documents. These systems typically extract predefined class information from documents using a pre-trained model to identify and extract a value from a document. An underlying machine learning model may have been trained using historic examples indicating the desired value. For example, the machine learning model may be trained to identify a total amount of an invoice document using many invoice training examples. This conventional extraction technique, however, falls short when a different value is desired. For example, a user may seek to extract a serial number from an invoice, but the machine learning model may have been only trained to extract a total amount value. In this manner, conventional data extraction techniques lack the flexibility to extract desired data.

BRIEF DESCRIPTION OF THE DRAWINGS

The accompanying drawings are incorporated herein and form a part of the specification.

FIG. 2A depicts a block diagram of an example document, according to some embodiments.

FIG. 2B depicts a block diagram of an example character processing flow, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1A:
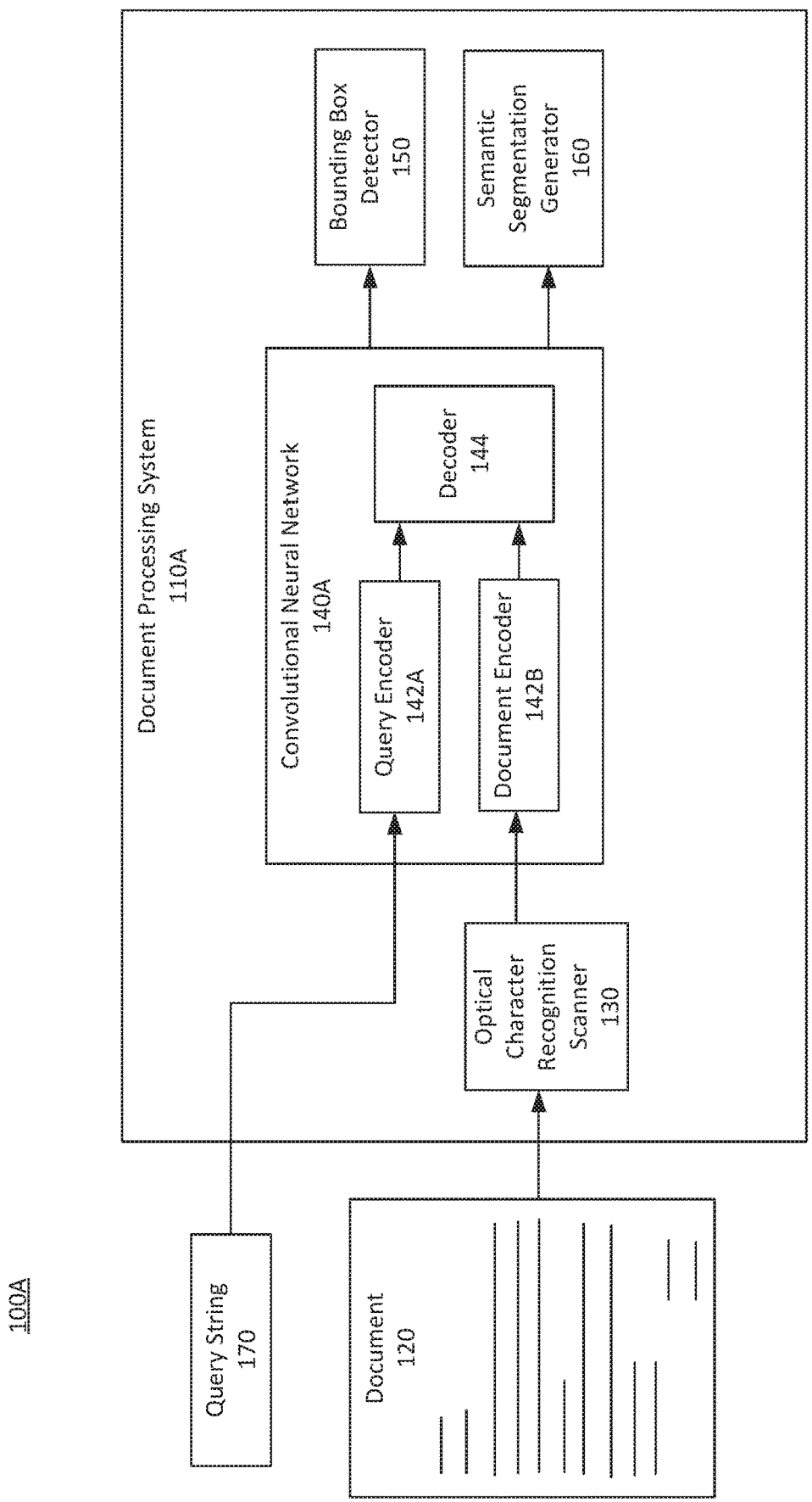
FIG. 1A depicts a block diagram of an example document processing environment, according to some embodiments.

Provided herein are system, apparatus, device, method and/or computer program product embodiments, and/or combinations and sub-combinations thereof, for querying document terms and identifying target data from documents.

In an embodiment, a document processing system may use machine learning techniques to process query terms and to extract corresponding target data from a document. The document processing system may receive a document and a query string. The document processing system may then process the document and query string to extract the target data identified by the query string. For example, the document may be invoice document and the query string may seek a "Car-ID" serial number. The document processing system may then process the document and query string to identify the "Car-ID" serial number specified in the invoice. The document processing system may also generalize the query string to return the same result. As will be further explained below, the document processing system may receive and process similar query strings such as "Car#", "AutoID", or "car number" and return the same result.

The document processing system may provide a flexible approach to querying semantic information from documents by leveraging deep learning, document understanding, and visual object detection techniques. The document processing system may process a document using a character grid representation, which may aid in identifying textual semantics as well as two-dimensional layout information. This information related to the structuring of the document as well as the document contents may provide a deep structure for processing by a neural network. Processing this information may allow the neural network to build a rich two-dimensional representation of the document. This representation and structure may allow the machine learning model to match the received query string with local content of the document to identify the target location containing the relevant information.

In this manner, the document processing system may extract class information, which its machine learning model may not have been exposed to before. In this manner, the document processing system may use the identified two-dimensional structure of a document to identify target data. Further, the processing of this two-dimensional structure may further aid in identifying similar but non-matching terms. For example, the document processing system may use this structure to generalize a query term of "Car-ID" and identify a related term of "Serial Number of Car" as specified within the document itself. In this manner, the document processing system may identify the content of the document even when the query string does not match exactly.

As will be further described below, the document processing system may use a convolutional neural network to process queries and extract target data from documents. The document processing system may identify key-value pairs. A key may correspond to a categorical representation of data (e.g., "Serial Number of Car") while its corresponding value may be the actual data (e.g., "ABC1654"). These pairs may identify categories of data with their corresponding values. The document processing system may also identify positional information related to the content of the documents in the form of word boxes to aid in identifying groupings of characters. Using the key-value pairs and/or positional data, the document processing system may apply document understanding and/or semantic segmentation techniques to extract the relevant data.

As will be further described below, the document processing system may generate a character grid representation of a document to allow encoding of the document while maintaining positional and textual information. The document processing system may then encode the character grid with a first encoder while encoding the query string with a second encoder. Depending on the desired configuration, a neural network of the document processing system may then process this encoded data using different decoder configurations.

In some embodiments, the neural network may use a single decoder. The output of the two encoders may be merged before entering a single decoder. The decoder may then output a segmentation mask identifying the target data. For example, the segmentation mask may specify a background class as well as a target data class specifying the areas including information to be extracted.

In some embodiments, the neural network may use multiple decoders. For example, the output of a character grid encoder may be input to a first decoder which generates a segmentation mask having key-value pairs. This segmentation mask may include several classes including a background class, a "key" class (e.g., "Invoice Date"), and a "value" class (e.g., "02/02/2020"). This segmentation mask may then be merged with an encoder output corresponding to the query string as well as the character grid and passed to another decoder. This other decoder may be a light weight decoder. This decoder may then output the desired "value" corresponding to the query string key.

These decoder configurations may provide several benefits directed to accuracy and efficiency. For example, when using the single decoder, the processing may be end-to-end and may use labels or annotated boxes for the value of the field that belongs to the input query-string (i.e., the key). In this manner, this configuration may be more label efficient. Using multiple decoders may provide the advantage of fine-tuning the model. For example, using multiple decoders may avoid tuning a complete decoder branch. This may save on computational workload as well as the processing of many training samples due to a large amount of optimizable parameters. Rather, the second lightweight decoder may have fewer parameters relative to the first decoder. In this manner, when fine tuning new domains, the training and use of training samples may be more efficient and require less computational overhead. Fewer training samples may be used for this training.

Various embodiments of these features will now be discussed with respect to the corresponding figures.

FIG. 1A depicts a block diagram depicting a document processing environment 100A, according to some embodiments. Document processing environment 100A includes document processing system 110A. Document processing system 110A may be implemented using one or more processors and/or may include hardware and/or software and may be configured to process documents. Document processing system 110A may include optical character recognition (OCR) scanner 130, convolutional neural network (CNN) 140A, bounding box detector 150, and/or semantic segmentation generator 160. Document processing system 110A may receive a document 120 for processing. Document 120 may be an image, PDF, word processing document, document file, and/or other visual representation or manifestation of data. Examples of document 120 may include an invoice, an instruction manual, and/or a slideshow presentation.

In an embodiment, document processing system 110A may be a standalone system configured to receive document 120 and determine semantic information and/or data from document 120. Document processing system 110A may store this semantic data in a memory device and/or a database. In an embodiment, document processing system 110A may communicate with a separate system. Document processing system 110A may transmit the extracted target data to the separate system. In an embodiment, document processing system 110A may be integrated with another system. For example, document processing system 110A may serve as a component of a larger system. In this embodiment, document processing system 110A may receive the document 120 from a location directed by the larger system. In an embodiment, the larger system may direct document processing system 110A to direct identified semantic information to a particular location.

Document processing system 110A may be configured to identify relevant information from the received document 120. Depending on the application and/or parameters established by CNN 140A, document processing system 110A may be configured to extract target data from document 120. This target data may be identified based on a received query string 170. As described above, depending on the implementation of document processing system 110A, query string 170 may be received from an external system and/or may be received from a system integrated with document processing system 110A. In some embodiments, query string 170 may be a string of characters and/or may be a computer command parsed by document processing system 110A to identify a string of characters. Query string 170 may indicate the desired data to be extracted from document 120.

An example of document 120 is depicted in FIG. 2A. FIG. 2A depicts a block diagram depicting an example document 200A, according to some embodiments. In an embodiment, the document 200A may be an invoice and may be analyzed by document processing system 110A. In an embodiment, document 200A may include information such as, a name, an address, a document identifier, a header, line items, summary description, signature block, prices, costs, and/or other information. In an embodiment, document 200A may include identifiers 210, 220, and 230 with corresponding values 215, 225, and 235. Identifiers 210, 220, and 230 may be one or more characters describing categories and/or classes of interest while values 215, 225, and 235 may be the content of document 200A corresponding to keys specified by a query string 170. For example, identifier 210 may be a header indicating a key-type corresponding to a class of data. Identifier 210 may indicate that document 200A is an invoice. Using identifier 210 along with the two-dimensional layout information of document 200A, document processing system 110A may identify corresponding value 215 as a document number. Depending on the desired information indicated by query string 170, this value 215 may be returned by document processing system 110A. Document processing system 110A may also return other values such as a car serial number as depicted as value 225 and/or a total amount as depicted as value 235.

To process document 120 and extract target data based on query string 170, document processing system 110A may retrieve the document 120 as a file or as a depicted image. In an embodiment, a separate system that controls document processing system 110A may choose to apply document processing system 110A to the document 120. Based on parameters set within document processing system 110A and/or based on new parameters established by the separate system, document processing system 110A may identify and extract desired data from document 200A based on query string 170. For example, document processing system 110A may extract invoice information such as product descriptions, the quantity of a purchase, the price of a purchase, or the amount of a purchase. Similarly, document processing system 110A may identify summary sale information and/or named entity information.

Returning to FIG. 1A, to process document 120, document processing system 110A may apply OCR scanner 130. OCR scanner 130 may be a module executed by one or more processors of document processing system 110A. OCR scanner 130 may analyze the document to extract, for example, a 1D sequence of characters from document 120. In an embodiment, OCR scanner 130 may extract string information and/or position information related to the characters of document 120. In an embodiment, document 120 may include 2D layout information and/or metadata. OCR scanner 130 may identify this metadata when scanning document 120.

In an embodiment, OCR scanner 130 may determine word bounding boxes in document 120. A word bounding box may represent a pixel area (e.g., width×height) occupied by the word. For example, referring to FIG. 2B, OCR scanner 130 may identify string 205A in document 120. OCR scanner 130 may identify two separate words in this string 205A as "INVOICE" and "34289". In an embodiment, OCR scanner 130 may recognize these words and associate each word with a word bounding box. OCR scanner 130 may also identify the location of the word bounding boxes in document 120. For example, OCR scanner 130 may utilize a coordinate system or a relative pixel location.

In an embodiment, OCR scanner 130 may divide word boxes into character boxes and convert string 205A into string 205B. For example, OCR scanner 130 may identify the pixels within a word bounding box include distinct characters. In this manner, OCR scanner 130 may convert the word box into character boxes. This division may maintain positioning information related to the characters.

In an embodiment, OCR scanner 130 may directly identify character boxes. For example, OCR scanner 130 may extract characters and pixel dimensions from document 120 without first identifying word boxes. In an embodiment, OCR scanner 130 may utilize metadata associated with document 120 to identify the character boxes and/or the word boxes. Based on the analysis performed by OCR scanner 130, document processing system 110A may recognize particular characters of document 120, the area occupied by the characters, and/or the location of the characters.

Using the information derived by OCR scanner 130, document processing system 110A may generate a character grid. OCR scanner 130 and/or one or more processors of document processing system 110A may generate the character grid. The character grid may represent a two-dimensional down-sampled version of document 120. The character grid may comprise grid cells corresponding to the characters of document 120. As previously explained, the character grid representation of document 120 may allow a machine learning algorithm or neural network to more quickly analyze document 120.

To generate the character grid, document processing system 110A may replace characters of document 120 with an index value. The index value may be assigned according to a mapping function. In an embodiment, an index value may be assigned via down-sampling using nearest neighbor interpolation. In an embodiment, document processing system 110A may utilize a dictionary to map a character to an index value. In an embodiment, the index value may be a vector. Document processing system 110A may generate the vector using model techniques such as, for example, Word2vec. Generating index values for the characters allows document processing system 110A to compile the character grid having index values for the characters contained within.

FIG. 2B depicts an example embodiment demonstrating the conversion of string 205B with character bounding boxes into string 205C having an index value corresponding to the characters. In an embodiment, the index values may replace the pixel area occupied by the characters. Using the index value representation, the character grid may utilize significantly less space compared to the pixels of document 120. Using this conversion, document processing system 110A is able to down-sample document 120 into a character grid having multiple index values. These index values may be lossless and may yield a character grid that has not lost character information while being smaller in size than document 120. While maintaining this lossless conversion, document processing system 110A is able to generate a 2D character grid that may be more easily processed by a machine learning algorithm.

In an embodiment, document processing system 110A may assign index values for each character of document 120. The collective index values along with the positioning information for the index values may comprise the character grid. In an embodiment, the character grid may be 1-hot encoded to yield an N-channel input image, where N corresponds to the number of indexed characters including a possible "background" class. The background class may, for example, refer to the background or "white space" of document 120. In an embodiment, to decrease the number of channels for computational reasons, document processing system 110A may apply index hashing. In some embodiments, the character grid may be considered as an image with many channels.

While FIG. 2B depicts a rectangular representation for a character, in an embodiment, document processing system 110A may additionally or alternatively utilize other forms for representation. For example, document processing system 110A may represent a character using a continuous distribution in a 1-hot encoded space rather than a 2D rectangular window function. In this case, the pixel area occupied by the character in the channel corresponding to the character could smoothly fall off from a value of "one" at the center location of the character to "zero" towards the edge of the area that the character occupies. For example, this representation may appear similar to a Gaussian distribution. The distribution may be truncated at the character boundary.

In an embodiment, the Gaussian distribution may cover neighboring grid cells. In this case, characters may overlap with neighboring characters. If this occurs, the conversion may change from a 1-hot encoding to a multiple-hot encoding. By using this non-rectangular representation model, document processing system 110A may potentially learn better local dependencies when applying the machine learning algorithms.

In an embodiment, the character grid may be further down-sampled in the 1-hot encoded space. Characters that previously occupied one grid cell may now be represented on the sub-cell level by a value that is less than "one." This representation may result from a bilinear interpolation of the grid cells.

After generating the character grid representation of document 120, document processing system 110A may apply input the character grid to convolutional neural network (CNN) 140A. CNN 140A may include query encoder 142A, document encoder 142B, and/or decoder 144. CNN 140A may be an artificial intelligence network and/or may apply machine learning algorithms to identify desired characters and/or aspects of document 120. CNN 140A may use query encoder 142A to encode a provided query string 170 into an embedding space capable of being merged with a decoder. Query string 170 may be a sequence of characters, a sequence of word-pieces, a sequence of words, and/or a combination of these characters. These characters or tokens may be 1-hot encoded or embedded into a token embedding space using, for example, word2vec, GloVe, or a language model such as, for example, BERT. This sequence of token embeddings may be further processed by one or more convolutional layers, bidirectional LSTM layers, and/or a combination layers. The output of query encoder 142A may be a sequence of feature vectors pooled into a feature vector. The sequence of feature vectors may be generated as one per input token. In some embodiments, query encoder 142A may pool these feature vectors into a feature vector using, for example, a max pooling or average pooling technique.

CNN 140A may include document encoder 142B to process a character grid generated based on document 120. Document encoder 142B may use computer vision and/or semantic segmentation techniques to process the character grid representation of document 120. For example, document encoder 142B may aid in determining semantic meaning, extracting key-values, and/or table information. Because the character grid utilizes index values, CNN 140A may quickly process the character grid relative to processing document 120. For example, CNN 140A may more quickly employ computer vision techniques or natural language processing techniques because document 120 has already been converted into a simpler form.

In some embodiments, to implement query encoder 142A, document encoder 142B, and/or decoder 144, CNN 140A may apply one or more blocks of convolutional layers. In some embodiments, each convolutional block may include one or more convolutional layers. These convolutional layers may be used for downsampling and/or pooling operations in query encoder 142A and/or document encoder 142B. Similarly, the convolutional layers may be used for upsampling operations in decoder 144. The operations may be performed after or before each block.

The outputs of query encoder 142A and document encoder 142B may be merged and applied to decoder 144. In some embodiments, the feature vector generated by query encoder 142A may be fused with the encoded character grid generated by document encoder 142B and applied to decoder 144. CNN 140A may generate a feature vector for each pixel in the respective decoder input resolution. This resolution may be the downsampled encoder resolution corresponding to the encoded character grid. In this manner, a two-dimensional image with the same feature vector replicated across the image may be used as a decoder input. The decoder inputs may be concatenated and/or added together. In this manner, decoder 144 may receive two inputs: the output of document encoder 142B as well as a two-dimensional query string encoder feature vector.

Using these inputs, decoder 144 may then identify the target data specified by query string 170. Decoder 144 may perform transposed convolution, deconvolution, or fractionally strided convolution to up-sample the results of the encodings. In this manner, decoder 144 may up-sample newly determined index values into a pixel location representation. Up-sampling may allow a user to view the output of document processing system 110A as a mask covering document 120. This mask may be an overlay over document 120 or may exist separately. Using the pixel representation, a user may view the semantic information via a display screen. In some embodiments, document processing system 110A may extract the target data as a text string.

Figure 2C:
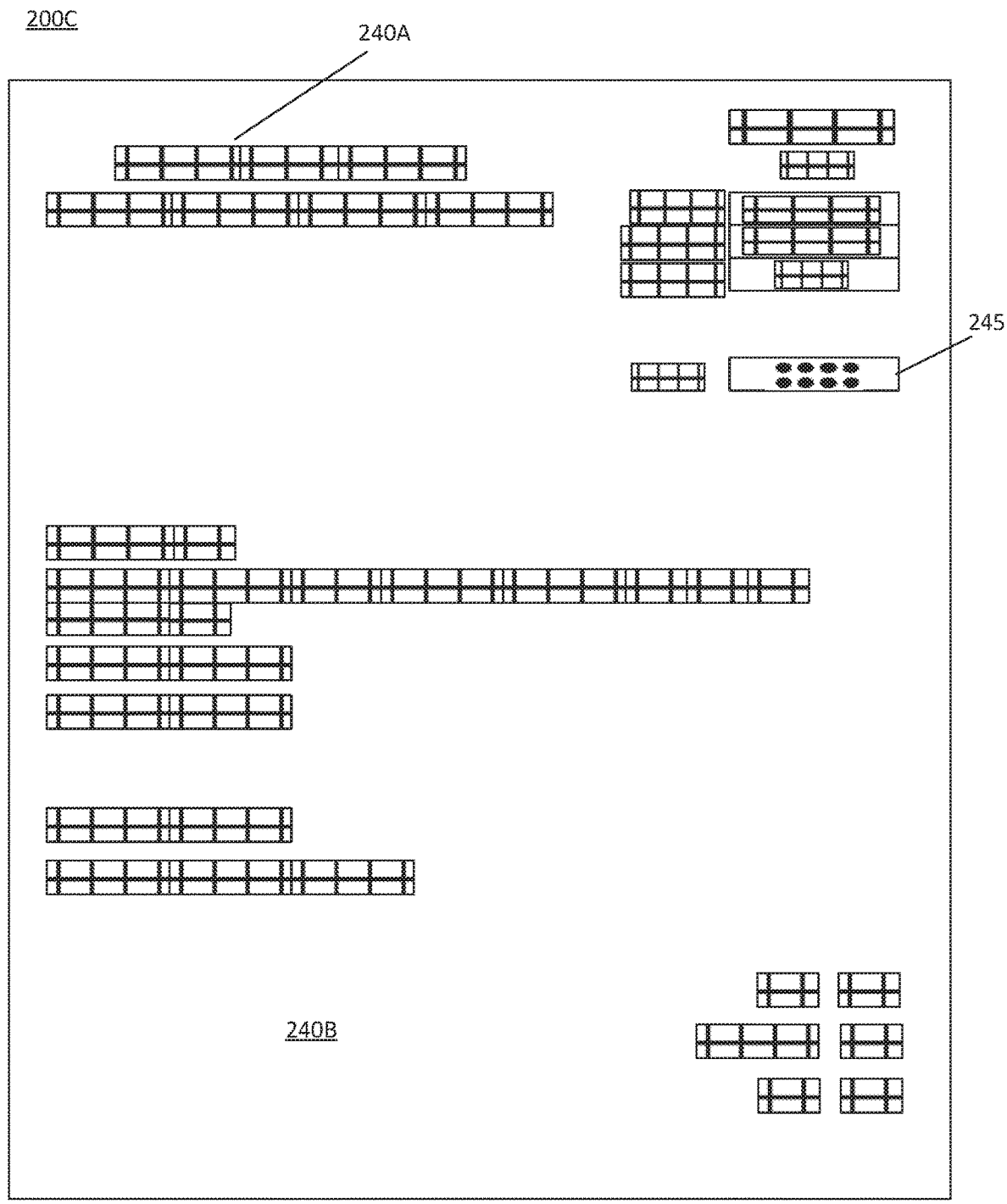
FIG. 2C depicts a block diagram of an example segmentation mask identifying target data, according to some embodiments.

After processing the character grid and query string 170, CNN 140A may utilize bounding box detector 150 and/or semantic segmentation generator 160 to identify the target data. In an embodiment, semantic segmentation generator 160 may produce a segmentation mask, indicating the character or word corresponding to query string 170. FIG. 2C depicts an example embodiment of a segmentation mask 200C for document 200A depicted in FIG. 2A. Segmentation mask 200C may include a background class 240A, 240B and/or a target data class 245. Background class 240A, 240B may represent portions of document 200A which are not the target data sought by query string 170. For example, background class 240A, 240B may identify "white space" in a document 200A and/or data that does not correspond to the target data. In contrast, the target data class 245 may indicate portions of the document corresponding to query string 170. In some embodiments, segmentation mask 200C may use patterns and/or colors to characterize the portions of document 200A with their corresponding class. Segmentation mask 200C may be visible to a user of document processing system 110A and/or may be a formatted file. In an embodiment, segmentation mask 200C may utilize a different pattern for each class.

While segmentation mask 200C includes an instance of data corresponding to target data class 245, in some embodiments, segmentation mask 200C may further identify multiple instances of a class. In this case, document processing system 110A may also generate a bounding box mask using bounding box detector 150. Bounding box detector 150 may aid in identifying different instances of a class. Bounding box detector 150 may produce a bounding box mask to aid in this process. The bounding box mask may include bounding boxes, which may visually identify different instances of target data class 245. Based on the application, distinguishing between the instances of target data class 245 may aid in more accurately analyzing the content of the document 120.

By processing a query string 170 with a character grid representation of document 120, document processing system 110A may generate segmentation mask 200C and/or a bounding box mask quickly relative to applying conventional computer vision techniques to a document. Document processing system 110A may return segmentation mask 200C, the bounding box mask, and/or the particular target data values identified by segmentation mask 200C as a response to query string 170. In this manner, document processing system 110A may facilitate the querying and identification of content from document 120. Document processing system 110A may then return the resulting data to the system providing query string 170. In some embodiments, document processing system 110A may store segmentation mask 200C and/or a bounding box mask, along with query string 170, document 120, and/or an OCR version of document 120. Document processing system 110A may make this information available to other systems to perform further analysis related to the document. In some embodiments, document processing system 110A may utilize this information in a software application and/or may display segmentation mask 200C and/or the bounding box mask on a display screen for user manipulation. Utilizing document processing system 110A, computer systems may easily recognize the relevant content of a document 120 corresponding to query string 170.

Figure 1B:
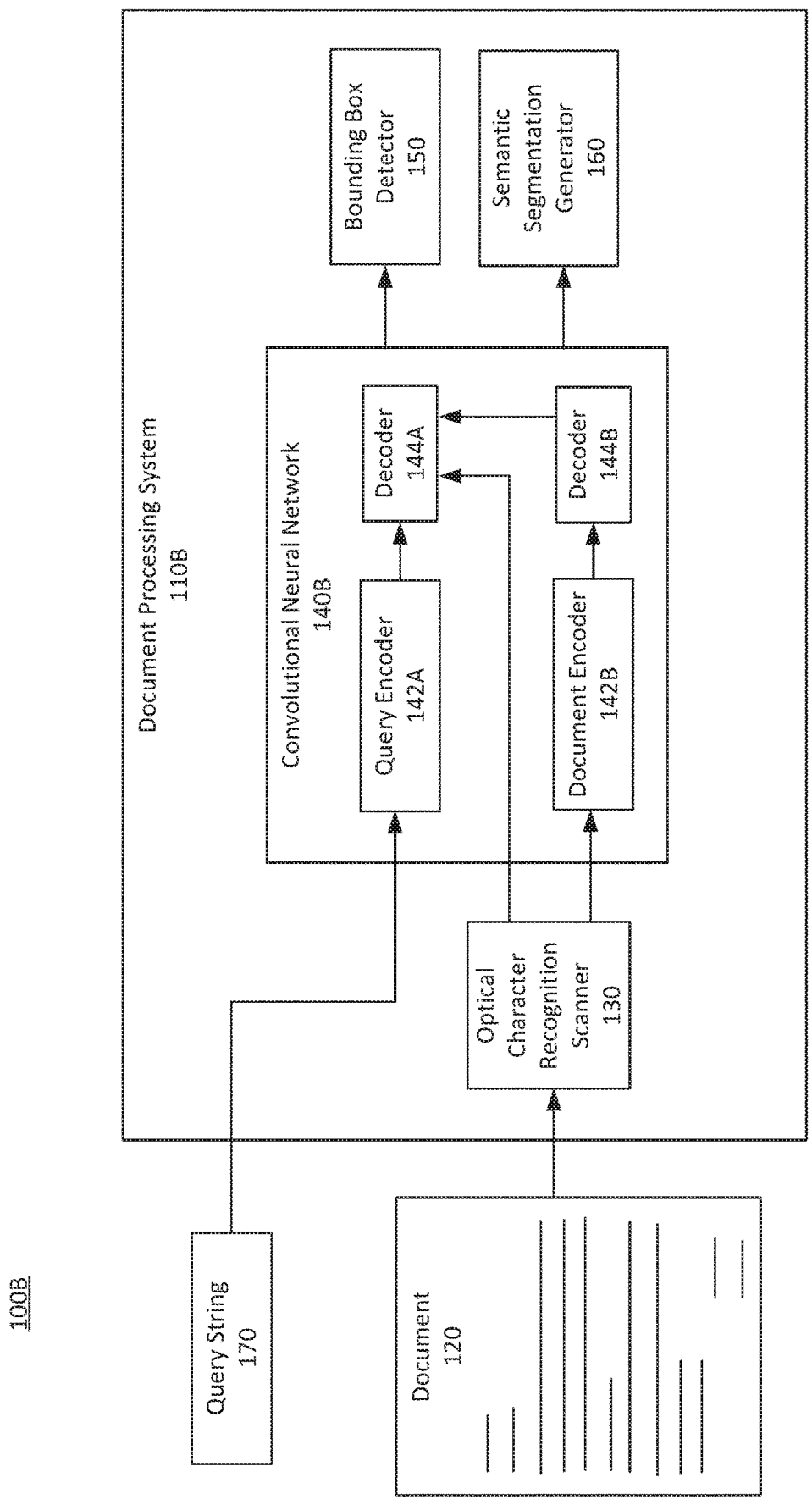
FIG. 1B depicts a block diagram of an example document processing environment with separate decoders, according to some embodiments.

FIG. 1B depicts a block diagram of an example document processing environment 100B with separate decoders 144A, 144B, according to some embodiments. Similar to document processing environment 100A as described with reference to FIG. 1A, document processing environment 100B includes document processing system 110B which is similar to document processing system 110A. Document processing system 110B similarly extracts target data from document 120 based on a received query string 170. Document processing system 110B may also include optical character recognition scanner 130, convolutional neural network (CNN) 140B, bounding box detector 150, and/or semantic segmentation generator 160.

Similar to CNN 140A, CNN 140B may process query string 170 and a character grid of document 120 to extract target data based on the query string 170. Further, CNN 140B may similarly use query encoder 142A and document encoder 142B. These encoders may operate in a manner similar to those from CNN 140A. In contrast to CNN 140A, CNN 140B may use two decoders 144A and 144B. CNN 140B may also process the outputs from query encoder 142A and document encoder 142B differently.

Similar to CNN 140A, query encoder 142A may process query string 170 and pass the output to decoder 144A. This output may be a sequence of feature vectors pooled into a single feature vector. As previously explained, these vectors may be pooled using max pooling or average pooling techniques.

Figure 2D:
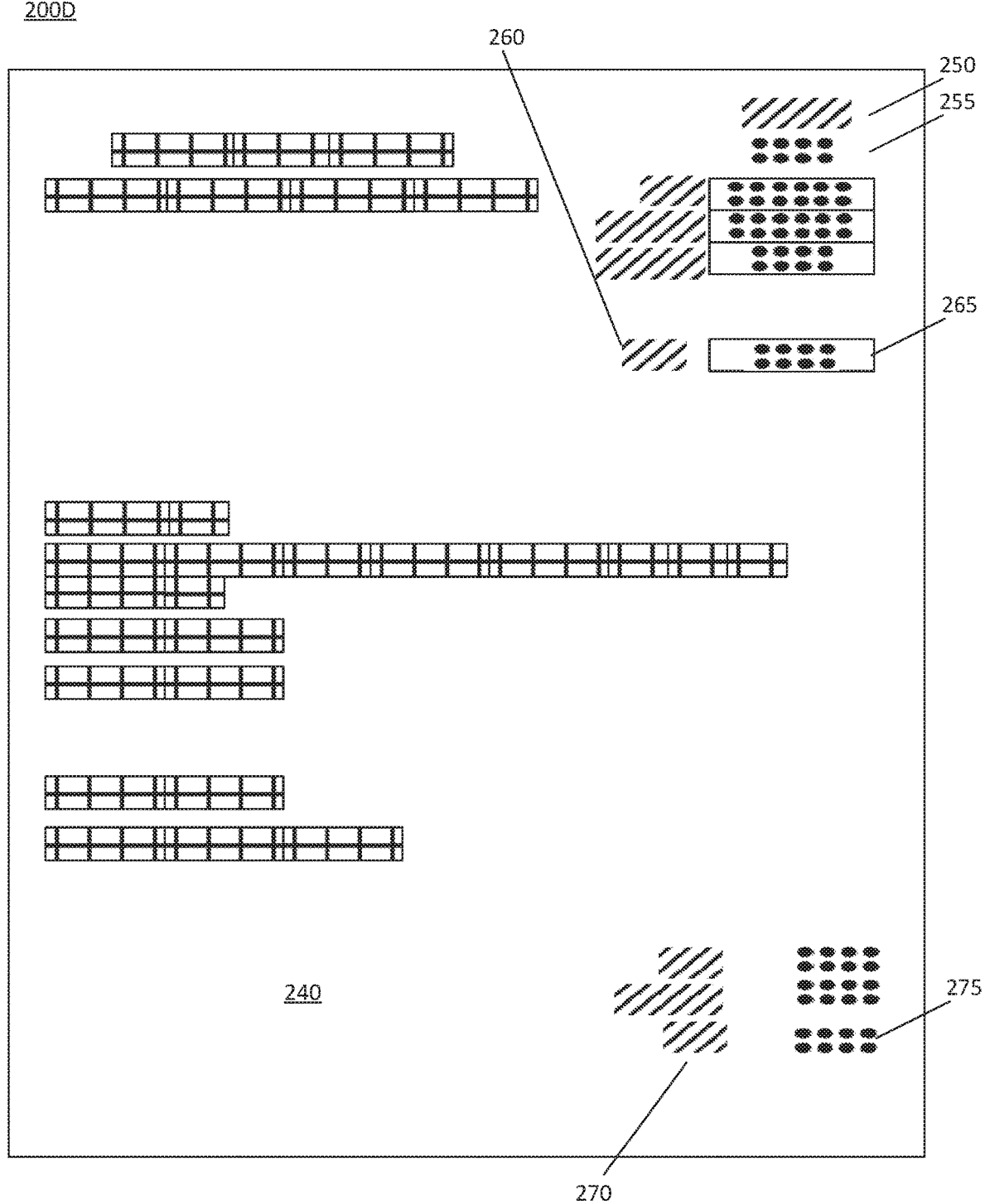
FIG. 2D depicts a block diagram of an example segmentation mask identifying key-value pairs, according to some embodiments.

In contrast to CNN 140A, however, CNN 140B may pass the output of document encoder 142B to a different decoder 144B. Decoder 144B may operate to produce a semantic segmentation mask indicating keys and values in document 120. An example embodiment of this semantic segmentation mask is depicted in FIG. 2D. To produce this semantic segmentation mask, intermediate training targets may have been used to identify keys and values.

Referring to FIG. 2D, FIG. 2D depicts a block diagram of an example segmentation mask 200D identifying key-value pairs, according to some embodiments. Segmentation mask 200D may be produced by decoder 144B as an intermediary process for extracting target data. Segmentation mask 200D may detect a background class 240, keys 250, 260, 270, and/or values 255, 265, 275. In view of document 200A, the keys and values may indicate classes and content identified from the document. For example, key 250 may corresponding to header indicating "INVOICE" while the value may be an invoice serial number. Similarly, key 260 may indicate a "Car #" while value 265 may correspond to the actual vehicle serial number. Key 270 may indicate a total sales price class while value 275 may indicate the value of the total amount. Another key may be, for example, a "Date" while a corresponding value may be "02/02/2020". While FIG. 2D depicts a visualization of segmentation mask 200D, in some embodiments, key regions may not be required. For example, decoder 144B may produce values 255, 265, 275 without indicating keys 250, 260, 270.

Returning to FIG. 1B, after generating segmentation mask 200D, decoder 144B may pass segmentation mask 200D to decoder 144A. Along with segmentation mask 200D, decoder 144A may receive segmentation mask 200D along with the output of query encoder 142A as well as the character grid representation of document 120. Similar to CNN 140A, the output of query encoder 142A may be a feature vector generated by pooling a sequence of feature vectors. A single feature may be generated and replicated to generate a two-dimensional image used by decoder 144A. For decoder 144A, CNN 140B may generate this two-dimensional using the resolution of the character grid. In this manner, decoder 144A may have three inputs: the character grid representation of document 120, the key-value segmentation mask 200D generated by decoder 144B, and/or the constructed two-dimensional feature vector from query encoder 142A. Decoder 144A may then concatenate and/or add these inputs. Decoder 144A may then produce a segmentation mask similar to segmentation mask 200C as described with reference to FIG. 2C. This segmentation mask may identify the target data desired from query string 170.

In some embodiments, decoder 144A may be a lightweight decoder relative to decoder 144B. For example, decoder 144A may be a single convolutional layer. Decoder 144A may select the correct value from the key-value proposals as received from decoder 144B. This selection may be conditioned on the constructed two-dimensional feature vector generated from query encoder 142A. In this manner, decoder 144A may identify the target data from document 120.

As previously explained, document processing systems 110A, 110B provide several benefits for extracting target data from documents. In particular, document processing systems 110A, 110B are end-to-end trainable. For training these systems, training data may include query strings that may not exactly match any string included in a document 120. For example, a query string 170 may list "Date" while the document 120 may have a key listing "dated". To provide this flexibility, document processing systems 110A, 110B mya using bounding box annotations indicating values corresponding to a particular class. These bounding boxes may denote the region of the document that includes the value corresponding to the key or query string 170. In this manner, a training sample may include a character grid input, a query string 170, and/or a target bounding box. For CNN 140B, the training samples may further include a set of value bounding boxes to construct the intermediate segmentation mask (e.g., segmentation mask 200D). These bounding boxes may specify values 255, 265, 275 and/or keys 250, 260, 270. In this manner, training CNN 140B may include using training data specifying a character grid, query string 170, value and/or key proposal bounding boxes, and/or target value bounding boxes.

The training of document processing systems 110A, 110B may also be fine-tuned. In some embodiments, to fine-tune CNN 140A, 140B, document encoder 142B may remain fixed while other elements of CNN 140A, 140B may be tuned. For example, CNN 140A may train the other elements such as query encoder 142A and decoder 144. In some embodiments, this training may be performed with a lower learning rate. For CNN 140B, document encoder 142B and decoder 144B may remain fixed. In this case, query encoder 142A and/or decoder 144A may be updated. To fine-tune these elements, fine tuning samples may be used to train or re-train these elements. This training may yield a model tailored to a specific domain of the fine tuning target samples. In some embodiments, a complete training set may be used with additional fine tuning samples. This type of training may yield a model which may both be generic and also extended to the new domain.

Figure 3:
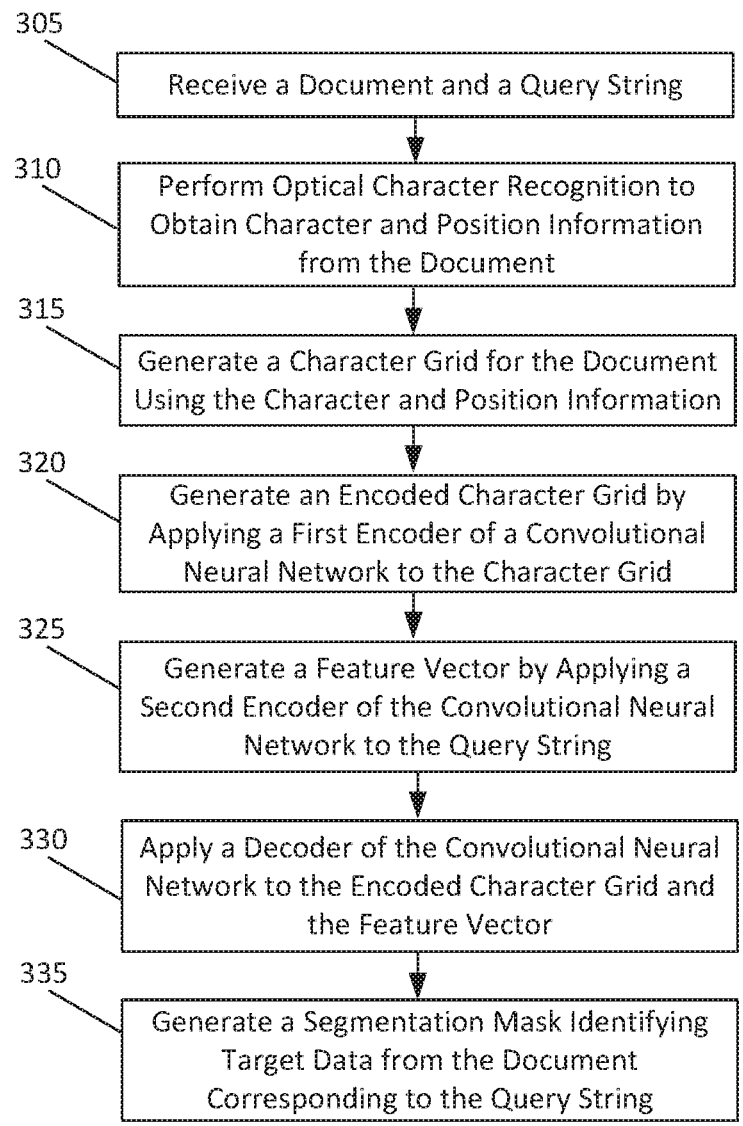
FIG. 3 depicts a flowchart illustrating a method for identifying target data, according to some embodiments.

FIG. 3 depicts a flowchart illustrating a method 300 for identifying target data, according to some embodiments. Method 300 shall be described with reference to FIG. 1A; however, method 300 is not limited to that example embodiment.

In an embodiment, document processing system 110A may utilize method 300 to extract target data from document 120 based on a received query string 170. The foregoing description will describe an embodiment of the execution of method 300 with respect to document processing system 110A. While method 300 is described with reference to document processing system 110A, method 300 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3, as will be understood by a person of ordinary skill in the art.

At 305, document processing system 110A may receive a document 120 and a query string 170. Document 120 may be a file including text. For example, document 120 may be an image, word processing document, PDF file, screenshot, and/or a combination of text and images. In an embodiment, document 120 may be a scanned document and/or may contain multiple pages and/or slides. Query string 170 may be a string of characters and/or may be a computer command parsed by document processing system 110A to identify a string of characters. Query string 170 may indicate the desired data to be extracted from document 120.

In an embodiment, document processing system 110A may be a standalone system configured to identify target data from document 120. Document processing system 110A may store this target data in a memory device and/or a database. In an embodiment, document processing system 110A may communicate with a separate system. Document processing system 110A may transmit the identified target data to the separate system. In an embodiment, document processing system 110A may be integrated with another system. For example, document processing system 110A may serve as a component of a larger system. In this embodiment, document processing system 110A may receive the document 120 and/or query string 170 from a location directed by the larger system. In an embodiment, the larger system may direct document processing system 110A to direct identified target data to a particular location.

At 310, document processing system 110A may perform optical character recognition on document 120 to obtain character and position information. The character information may relate to letters, numbers, symbols, words, a collection or combination of letters, numbers, and/or symbols, symbolic mark, an image, and/or other visual indicators on a document. Document processing system 110A may utilize OCR scanner 130 to perform the character recognition. OCR scanner 130 may identify word and/or character strings. OCR scanner 130 may identify the location of the characters within document 120. OCR scanner 130 may perform a pixel based analysis to identify the characters and position information.

At 315, document processing system 110A may generate a character grid for the document 120 using the character and position information. Generating the character grid may include replacing characters of document 120 with an index value. The index value may be assigned according to a mapping function. In an embodiment, an index value may be assigned via down-sampling using nearest neighbor interpolation. In an embodiment, document processing system 110A may utilize a dictionary to map a character to an index value. In some embodiments, the index value may be a vector. Document processing system 110A may generate the vector using model techniques such as, for example, Word2vec. Generating index values for the characters allows document processing system 110A to compile the character grid having index values for the characters contained within.

In some embodiments, generating the character grid may result in a down-sampled version of document 120. The down-sampled version may result in faster processing of document 120.

At 320, document processing system 110A may generate an encoded character grid by applying a first encoder of a convolutional neural network (CNN) 140A to the character grid. The first encoder may be document encoder 142B. Document encoder 142B may use computer vision and/or semantic segmentation techniques to process the character grid representation of document 120. For example, document encoder 142B may aid in determining semantic meaning, extracting key-values, and/or table information. Because the character grid utilizes index values, CNN 140A may quickly process the character grid relative to processing document 120. For example, CNN 140A may more quickly employ computer vision techniques or natural language processing techniques because document 120 has already been converted into a simpler form.

At 325, document processing system 110A may generate a feature vector by applying a second encoder of CNN 140A to query string 170. The second encoder may be query encoder 142A. CNN 140A may use query encoder 142A to encode a provided query string 170 into an embedding space capable of being merged with a decoder. Query string 170 may be a sequence of characters, a sequence of word-pieces, a sequence of words, and/or a combination of these characters. These characters or tokens may be 1-hot encoded or embedded into a token embedding space using, for example, word2vec, GloVe, or a language model such as, for example, BERT. This sequence of token embeddings may be further processed by one or more convolutional layers, bidirectional LSTM layers, and/or a combination layers. The output of query encoder 142A may be a sequence of feature vectors pooled into a feature vector. The sequence of feature vectors may be generated as one per input token. In some embodiments, query encoder 142A may pool these feature vectors into a feature vector using, for example, a max pooling or average pooling technique.

At 330, document processing system 110A may apply a decoder 144 of the CNN 140A to the encoded character grid and the feature vector. In some embodiments, the outputs of query encoder 142A and document encoder 142B may be merged and applied to decoder 144. In some embodiments, the feature vector generated by query encoder 142A may be fused with the encoded character grid generated by document encoder 142B and applied to decoder 144. CNN 140A may generate a feature vector for each pixel in the respective decoder input resolution. This resolution may be the down-sampled encoder resolution corresponding to the encoded character grid. In this manner, a two-dimensional image with the same feature vector replicated across the image may be used as a decoder input. The decoder inputs may be concatenated and/or added together. In this manner, decoder 144 may receive two inputs: the output of document encoder 142B as well as a two-dimensional query string encoder feature vector.

Using the encoded character grid and the feature vector, decoder 144 may then identify the target data specified by query string 170. Decoder 144 may perform transposed convolution, deconvolution, or fractionally strided convolution to up-sample the results of the encodings. In this manner, decoder 144 may up-sample newly determined index values into a pixel location representation. Up-sampling may allow a user to view the output of document processing system 110A as a mask covering document 120. This mask may be an overlay over document 120 or may exist separately. Using the pixel representation, a user may view the semantic information via a display screen. In some embodiments, document processing system 110A may extract the target data as a text string.

At 335, document processing system 110A may generate a segmentation mask identifying target data from the document 120 corresponding to the query string 170. In some embodiments, this segmentation mask may be a binary segmentation mask that locates the information corresponding to query string 170 on document 120. This segmentation mask may be, for example, segmentation mask 200C as depicted with reference to FIG. 2C. Segmentation mask 200C may identify the target data specified by query string 170. In some embodiments, decoder 144 may select the target data by conditioning the encoded character grid on the constructed two-dimensional feature vector generated from query encoder 142A. In this manner, decoder 144A may identify the target data from document 120. Document processing system 110A may then return the resulting data to the system providing query string 170.

Figure 4:
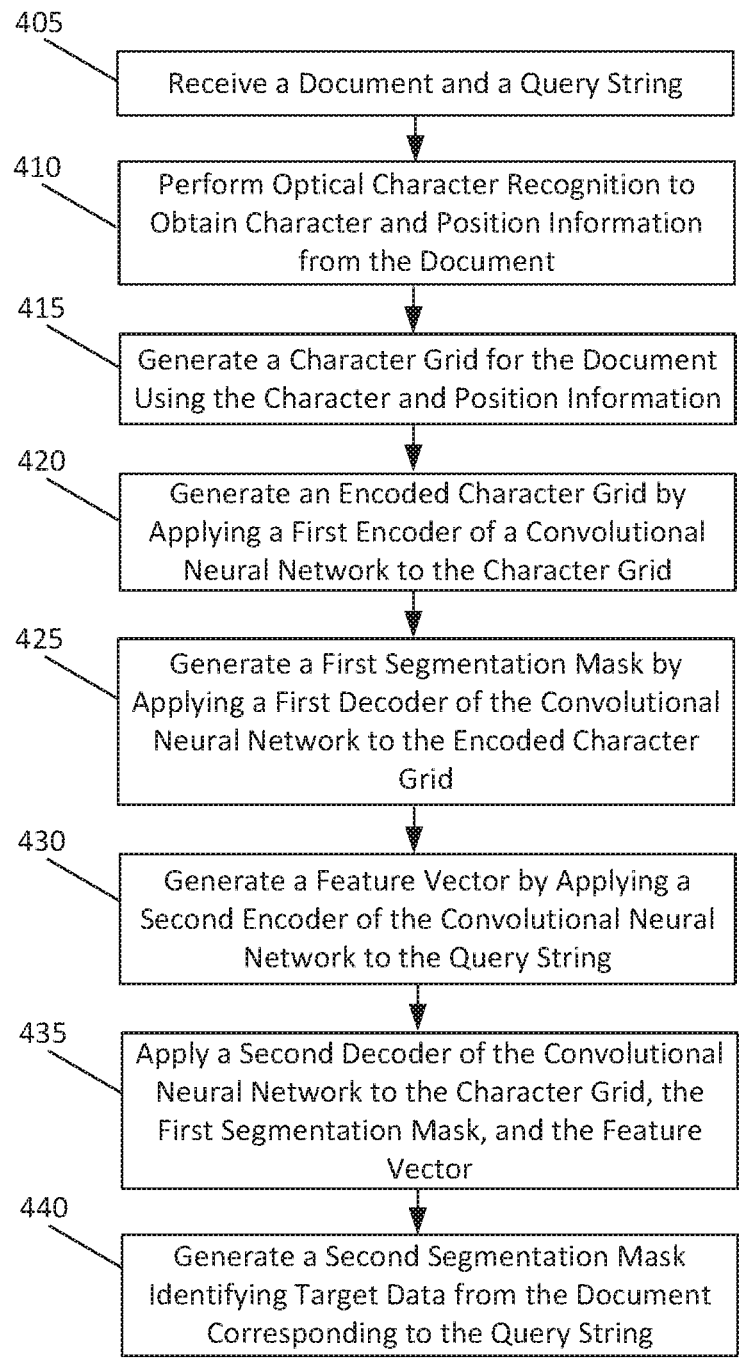
FIG. 4 depicts a flowchart illustrating a method for identifying target data using separate decoders, according to some embodiments.

FIG. 4 depicts a flowchart illustrating a method 400 for identifying target data using separate decoders, according to some embodiments. Method 400 shall be described with reference to FIG. 1B; however, method 400 is not limited to that example embodiment.

In an embodiment, document processing system 110B may utilize method 400 to extract target data from document 120 based on a received query string 170. The foregoing description will describe an embodiment of the execution of method 400 with respect to document processing system 110B. While method 400 is described with reference to document processing system 110B, method 400 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4, as will be understood by a person of ordinary skill in the art.

At 405, document processing system 110B may receive a document 120 and a query string 170. Document 120 may be a file including text. For example, document 120 may be an image, word processing document, PDF file, screenshot, and/or a combination of text and images. In an embodiment, document 120 may be a scanned document and/or may contain multiple pages and/or slides. Query string 170 may be a string of characters and/or may be a computer command parsed by document processing system 110B to identify a string of characters. Query string 170 may indicate the desired data to be extracted from document 120.

In an embodiment, document processing system 110B may be a standalone system configured to identify target data from document 120. Document processing system 1110B may store this target data in a memory device and/or a database. In an embodiment, document processing system 110B may communicate with a separate system. Document processing system 110B may transmit the identified target data to the separate system. In an embodiment, document processing system 110B may be integrated with another system. For example, document processing system 1101B may serve as a component of a larger system. In this embodiment, document processing system 110B may receive the document 120 and/or query string 170 from a location directed by the larger system. In an embodiment, the larger system may direct document processing system 110B to direct identified target data to a particular location.

At 410, document processing system 110B may perform optical character recognition on document 120 to obtain character and position information. This operation may be performed in a manner similar to 310.

At 415, document processing system 110B may generate a character grid for the document 120 using the character and position information. This operation may be performed in a manner similar to 315.

At 420, document processing system 110B may generate an encoded character grid by applying a first encoder of a convolutional neural network (CNN) 140B to the character grid. This operation may be performed in a manner similar to 320. The first encoder may be document encoder 142B.

At 425, document processing system 110B may generate a first segmentation mask by applying a first decoder of CNN 140B to the encoded character grid. The first decoder may be decoder 144B. The first segmentation mask may be an intermediary segmentation mask. Decoder 144B may operate to produce this intermediary segmentation mask indicating keys and values in document 120. An example embodiment of this intermediary semantic segmentation mask is depicted in FIG. 2D. To produce this semantic segmentation mask, intermediate training targets may have been used to identify keys and values. As previously explained, segmentation mask 200D may identify key-value pairs based on previous training. Generating this intermediate segmentation mask may aid in extracting target data.

At 430, document processing system 110B may generate a feature vector by applying a second encoder of CNN 140B to query string 170. The second encoder may be query encoder 142A. This operation may be performed in a manner similar to 325.

At 435, document processing system 110B may apply a second decoder 144A of the CNN 140B to the character grid, the first segmentation mask, and the feature vector. Along with segmentation mask 200D, decoder 144A may receive segmentation mask 200D along with the output of query encoder 142A as well as the character grid representation of document 120. The output of query encoder 142A may be a feature vector generated by pooling a sequence of feature vectors. A single feature may be generated and replicated to generate a two-dimensional image used by decoder 144A. For decoder 144A, CNN 140B may generate this two-dimensional using the resolution of the character grid. In this manner, decoder 144A may have three inputs: the character grid representation of document 120, the key-value segmentation mask 200D generated by decoder 144B, and/or the constructed two-dimensional feature vector from query encoder 142A. Decoder 144A may then concatenate and/or add these inputs. Decoder 144A may then produce a segmentation mask similar to segmentation mask 200C as described with reference to FIG. 2C. This segmentation mask may identify the target data desired from query string 170.

In some embodiments, decoder 144A may be a lightweight decoder relative to decoder 144B. For example, decoder 144A may be a single convolutional layer. Decoder 144A may select the correct value from the key-value proposals as received from decoder 144B. This selection may be conditioned on the constructed two-dimensional feature vector generated from query encoder 142A. In this manner, decoder 144A may identify the target data from document 120.

At 440, document processing system 110B may generate a second segmentation mask identifying target data from the document 120 corresponding to the query string 170. This operation may be performed in a manner similar to 335.

Figure 5:
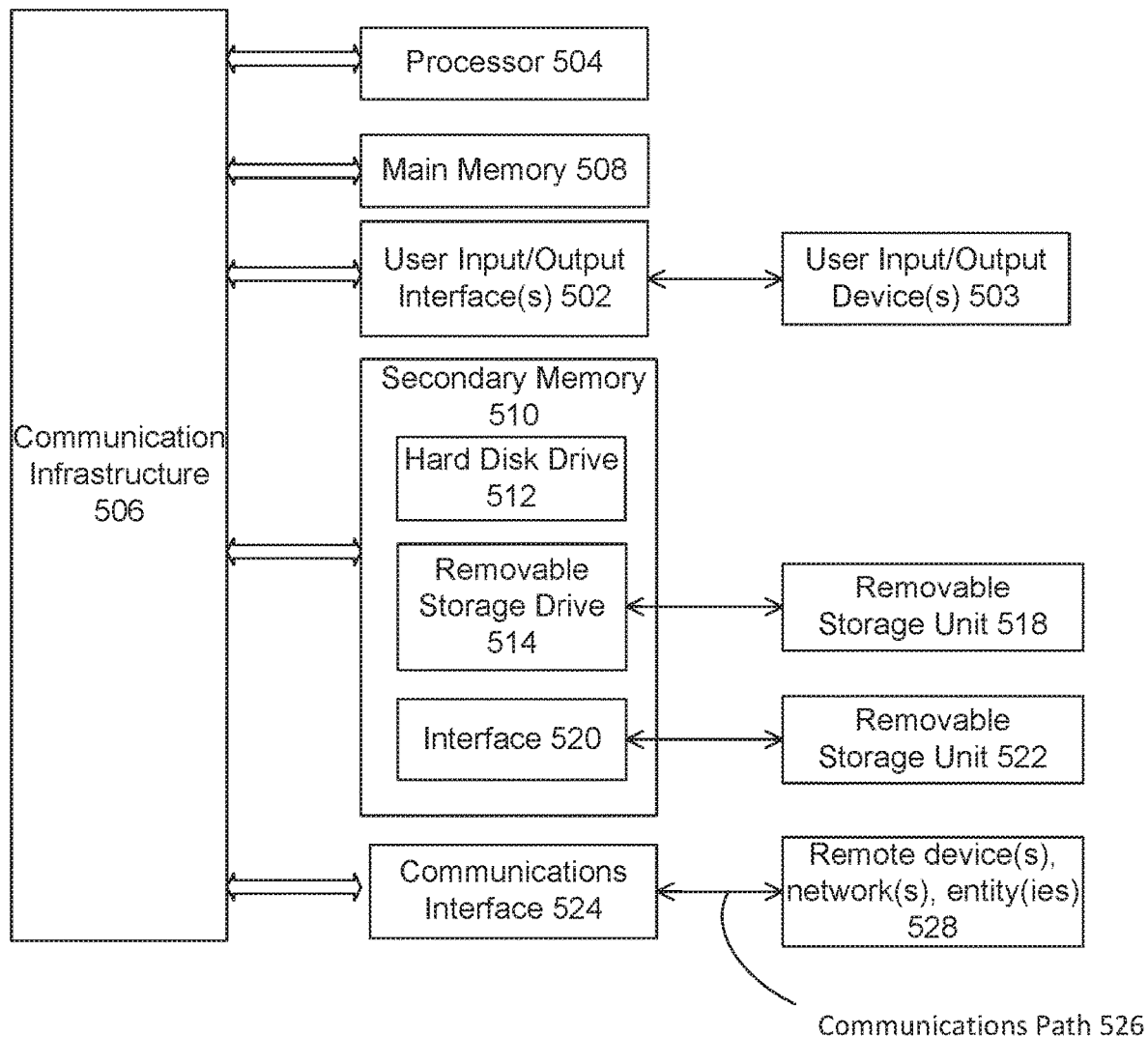
FIG. 5 depicts an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
performing optical character recognition on a document;
generating a character grid using character information obtained from the optical character recognition, wherein the character grid is a two-dimensional down-sampled version of the document;
applying a convolutional neural network (CNN) to the character grid and to a query string; and
in response to the applying, generating a segmentation mask identifying target data of the document corresponding to the query string.

2. The computer implemented method of claim 1, wherein the applying further comprises:
generating an encoded character grid by applying a first encoder of the CNN to the character grid; and
generating a feature vector by applying a second encoder of the CNN to the query string.

3. The computer implemented method of claim 2, wherein generating the feature vector further comprises:
pooling a sequence of feature vectors corresponding to the query string.

4. The computer implemented method of claim 2, wherein the applying further comprises:
applying a decoder to the encoded character grid and the feature vector to generate the segmentation mask identifying target data.

5. The computer implemented method of claim 2, wherein the applying further comprises:
generating an intermediary segmentation mask by applying a first decoder to the encoded character grid; and
applying a second decoder of the CNN to the character grid, the intermediary segmentation mask, and the feature vector to generate the segmentation mask identifying target data.

6. The computer implemented method of claim 5, wherein the intermediary segmentation mask identifies one or more key-value pairs of data from the document.

7. The computer implemented method of claim 5, wherein the second decoder comprises a single convolutional layer.

8. A system, comprising:
a memory; and
at least one processor coupled to the memory and configured to:
perform optical character recognition on a document;
generate a character grid using character information obtained from the optical character recognition, wherein the character grid is a two-dimensional down-sampled version of the document;
apply a convolutional neural network (CNN) to the character grid and to a query string; and
in response to the applying, generate a segmentation mask identifying target data of the document corresponding to the query string.

9. The system of claim 8, wherein to apply the CNN, the at least one processor is further configured to:
generate an encoded character grid by applying a first encoder of the CNN to the character grid; and
generate a feature vector by applying a second encoder of the CNN to the query string.

10. The system of claim 9, wherein to generate the feature vector, the at least one processor is further configured to:
pool a sequence of feature vectors corresponding to the query string.

11. The system of claim 9, wherein to apply the CNN, the at least one processor is further configured to:
apply a decoder to the encoded character grid and the feature vector to generate the segmentation mask identifying target data.

12. The system of claim 9, wherein to apply the CNN, the at least one processor is further configured to:
generate an intermediary segmentation mask by applying a first decoder to the encoded character grid; and
apply a second decoder of the CNN to the character grid, the intermediary segmentation mask, and the feature vector to generate the segmentation mask identifying target data.

13. The system of claim 12, wherein the intermediary segmentation mask identifies one or more key-value pairs of data from the document.

14. The system of claim 12, wherein the second decoder comprises a single convolutional layer.

15. A non-transitory computer-readable device having instructions stored thereon that, when executed by at least one computing device, cause the at least one computing device to perform operations comprising:
performing optical character recognition on a document;
generating a character grid using character information obtained from the optical character recognition, wherein the character grid is a two-dimensional down-sampled version of the document;
applying a convolutional neural network (CNN) to the character grid and to a query string; and
in response to the applying, generating a segmentation mask identifying target data of the document corresponding to the query string.

16. The non-transitory computer-readable device of claim 15, wherein the applying further comprises:

generating an encoded character grid by applying a first encoder of the CNN to the character grid; and generating a feature vector by applying a second encoder of the CNN to the query string.

17. The non-transitory computer-readable device of claim 16, wherein generating the feature vector further comprises:

pooling a sequence of feature vectors corresponding to the query string.

18. The non-transitory computer-readable device of claim 16, wherein the applying further comprises:

applying a decoder to the encoded character grid and the feature vector to generate the segmentation mask identifying target data.

19. The non-transitory computer-readable device of claim 16, wherein the applying further comprises:

generating an intermediary segmentation mask by applying a first decoder to the encoded character grid; and applying a second decoder of the CNN to the character grid, the intermediary segmentation mask, and the feature vector to generate the segmentation mask identifying target data.

20. The non-transitory computer-readable device of claim 19, wherein the intermediary segmentation mask identifies one or more key-value pairs of data from the document and wherein the second decoder comprises a single convolutional layer.

* * * * *